United States Patent [19]

Huang et al.

[11] 4,324,427
[45] Apr. 13, 1982

[54] AUTOMOBILE BUMPER WITH ADIABATIC DEVICE

[76] Inventors: Vincent P. W. Huang; Laurence P. Y. Huang, both of P.O. Box 22799, Taipei, Taiwan

[21] Appl. No.: 165,946

[22] Filed: Jul. 3, 1980

[51] Int. Cl.³ .............................................. B60R 19/02
[52] U.S. Cl. ................................. 293/106; 293/117; 296/136
[58] Field of Search ................ 293/106, 117; 296/136

[56] References Cited

U.S. PATENT DOCUMENTS 1,719,055  7/1929  Herzer ................................. 293/106
3,222,102  12/1965  Lucas ................................. 296/136

FOREIGN PATENT DOCUMENTS 473572  10/1937  United Kingdom ............... 296/137

*Primary Examiner*—Robert R. Song
*Attorney, Agent, or Firm*—Browdy and Neimark

[57] ABSTRACT

An automobile bumper has a flexible adiabatic device and buffer springs therein. The adiabatic device may be partially drawn out of the bumper to cover the top surface of the automobile body so as to prevent the sun from shining directly on the automobile when the automobile is parked in an open-air place, and may act as a shock-absorbing device when impact blows are received in the bumper.

10 Claims, 3 Drawing Figures

AUTOMOBILE BUMPER WITH ADIABATIC DEVICE

BACKGROUND OF THE INVENTION

1. FIELD OF THE INVENTION

This invention relates to a shockproof bumper for automobiles and more particularly, to a bumper provided with an adiabatic device which is used for dual purposes of protectively covering the top surface of the automobile body as well as for its shockproofing function.

2. DESCRIPTION OF THE PRIOR ART

The temperature in an automobile could be increased to an intolerably high degree by the shining of the sun thereon when the automobile is left uncovered. This disadvantage especially takes place in the summer months. Although the hot air within the automobile can be cooled either by driving the automobile and opening the windows, or by actuating the air conditioning device, it takes a certain time period to reduce the temperature of the hot air and this causes some inconvenience to the passengers. Furthermore, using an air conditioning device not only consumes additional gas energy but also reduces the useful life of the automobile. Therefore, in the present era of oil crisis, a device, which in operation does not consume any energy, derived from gas combustion and which device is used to reduce the temperature of the air within the automobile to a desirable range is anxiously desired in the art. In addition, the construction of most conventional bumpers is rigid so that the automobile body gets damaged easily on impact and the passengers may, as a result, be injured when an unexpected accident occurs.

BRIEF DESCRIPTION OF THE PRESENT INVENTION

In accordance with the present invention a novel bumper comprises a supporting bracket for mounting on the front side or rear side of an automobile; a bracket casing, attached movably to the supporting bracket by means of a number of rivets, forming a substantially hollow rectangular housing for receiving stands to support one or more winding shafts therebetween; at least one piece of flexible adiabatic sheet preferably made of textile material and wound on the winding shafts so as to permit one to draw it out of the bracket casing to cover the top surface of the automobile body; autoreversing rotation devices mounted on each said winding shaft to enable the drawn out adiabatic sheet to be reversely re-wound on the winding shaft when it is released; and a number of buffer springs mounted between the stands and the supporting bracket to enhance the shock resistance ability of the bumper upon accidental impact.

It is a main object of the present invention to provide a novel bumper having a flexible adiabatic device therein. The adiabatic device may be partially drawn out of the bumper to cover the top surface of the automobile body so as to shield the automobile body from the sun shining directly on it when the automobile is parked in an open-air place.

Another object of the present invention is to provide a bumper whose shock resistance ability is increased by means of the above described adiabatic device and by a number of buffer springs mounted therein.

These and other features, objects and advantages of the present invention will become more apparent by referring to the following detailed description and drawings, in which:

DETAILED DESCRIPTION OF THE PREFERRED EMBODIMENTS

Figure 1:
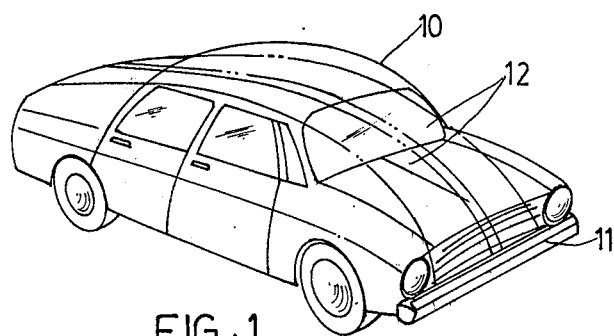
FIG. 1 is a perspective view of an automobile provided with a preferred embodiment of the invention.

Referring now to FIG. 1, there is shown a perspective view of an automobile 10 provided with a novel bumper 11 in accordance with the present invention. As shown in FIG. 1, two pieces of adiabatic sheet 12 indicated by dotted lines are drawn out of the bumper 11 whose front edges are fixed at the rear of the automobile body so as to cover the whole top surface of the automobile 10. It should be appreciated that the bumper 11 can also be mounted on the rear of the automobile body.

Figure 2:
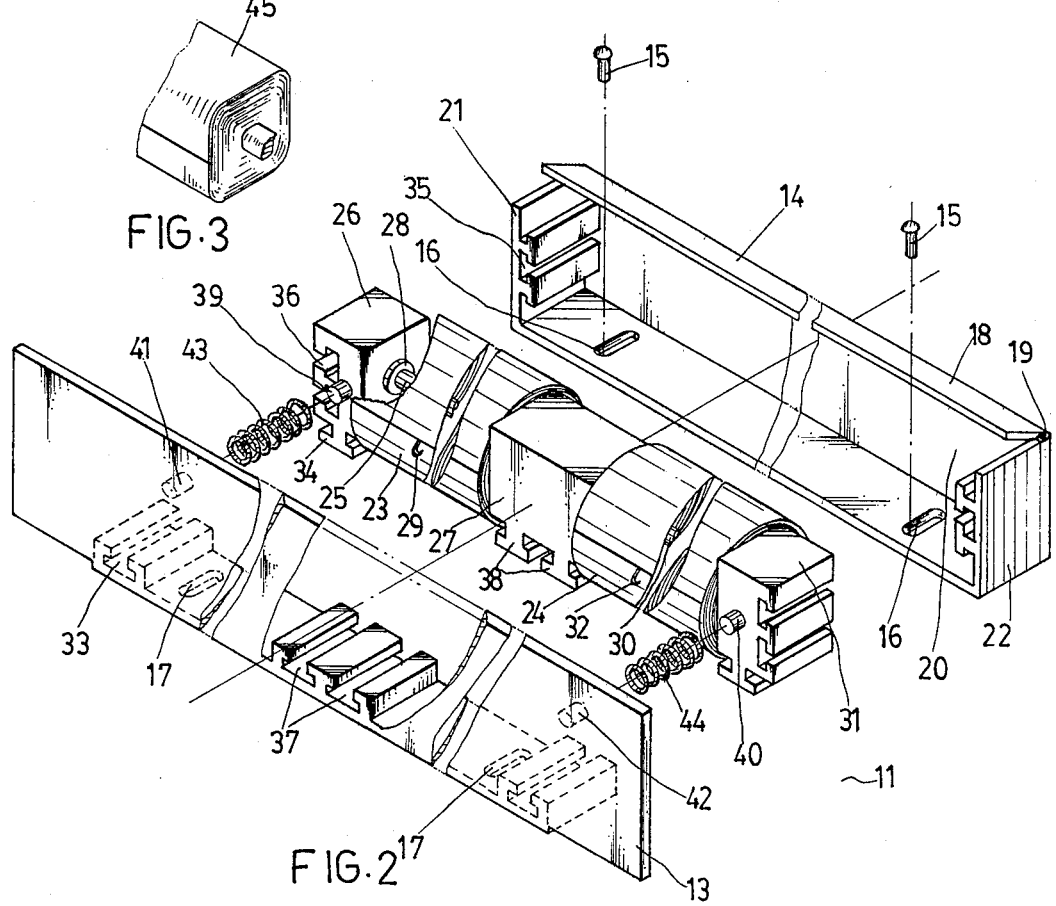
FIG. 2 is an enlarged perspective exploded view of a preferred embodiment of the invention.

FIG. 2 shows an exploded construction of the novel bumper 11 of the present invention which includes a supporting bracket 13 being substantially a rectangular plate to be mounted on the rear or front of the conventional automobile body by known skills and having a horizontal projecting mounting provided with a number of mortises 33, 37 and longitudinal openings 17 thereon; a bracket casing 14 having corresponding openings 16 provided on a lower wall thereof and mortises 35 on a pair of opposed walls 21, 22 thereof; two sets of adiabatic devices 23, 24 received in the bracket casing 14; and at least two buffer springs 43, 44 supported between the supporting bracket 13 and the adiabatic devices 23, 24. By inserting rivets 15 through the longitudinal openings 17 and the corresponding openings 16, the bracket casing 14 could be mounted on and move with the supporting bracket 13. Upper wall 18 of the bracket casing 14 is pivoted on the front wall 20 of the casing 14 by means of a hinge 19. The adiabatic device 23 is composed of two stands 26, 27, a winding shaft 25 mounted partly on the stands 26, 27 for storing a roll of flexible adiabatic sheet 12, and an auto-reversing rotation device 28 mounted on one of the stands 26, 27 and attached to one end of the winding shaft 25. Provided on the front edge of the flexible adiabatic sheet 12 are a plurality of hook members 29 which are adapted to hook to the opposite side of the automobile body when the adiabatic sheet is drawn out of the bumper 11 to cover the top surface of the automobile body. In other words, in the adiabatic operation, the flexible sheet 12 could be held firmly by the hook members 29 and the winding shaft 25. The stand 26 is provided with two protruding T-shaped joints 34, 36 for joining with the mortise 33 of the supporting bracket 13 and the mortise 35 of the bracket casing 14 respectively. To join the mortises 37 of the supporting bracket 13, the stand 27 is provided with corresponding T-shaped joints 38. Thus, the adiabatic device 23 is not fixed, but movably mounted, on the supporting bracket 13 and the bracket casing 14. Similarly, the adiabatic device 24 is composed of two stands 27, 31, a winding shaft 30 for storing a roll of flexible sheet 12, and an auto-reversing rotation device (not shown). The functions of all the members of the adiabatic device 24 are the same as that of the previously described adiabatic device 23. In order to provide a simple mechanical relationship, the stand 27 may accomodate the two adibatic devices 23, 24 simultaneously; otherwise, it may be divided into two stands to accomodate the adiabatic devices 23, 24 separately. Two buffer springs 43, 44 are separately supported by a pair of opposing stems 39, 41 and 40, 42 provided on the stands 26, 31 and the supporting bracket 13.

Figure 3:
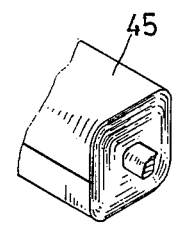
FIG. 3 is a partially perspective view of another type of adiabatic device in accordance with the invention having a substantially square section.

FIG. 3 shows a partially perspective view of a roll of a flexible adiabatic sheet 45 having a substantially square section. When this kind of flexible adiabatic sheet 45 is stored in the bracket casing 14 if the bumper 11 is impacted and the buffer springs 43, 44 are accordingly compressed, the front side of the roll of the adiabatic sheet 45 will contact tightly against the inner wall of the bumper 11 so as to give to the bumper a more uniform anti-shock efficiency. After the external impact pressure on the bumper is removed, the adiabatic devices 23, 24 may be returned to their original position by the buffer springs 43, 44.

In use, when the automobile is parked in an open-air place, the owner may readily open the upper wall 18 of the bracket casing 14 and draw the adiabatic sheet out of the bumper 11 to cover the top surface of the automobile body, and attach the sheet to the auto body by the hooks provided on the front edge of the sheet (as shown in FIG. 1). After the hook members are released the adiabatic sheet may be automatically reversed to its original position by the reversing rotation device 28. During the reversing procedure of the adiabatic sheet, the upper wall 18 of the bracket casing 14 may supply, by its own gravity, a suitable pressure on the sheet so as to make the sheet form a tight roll.

Additionally, the adiabatic sheet is preferably made of polyethylene cloth bonded to nylon cloth so that the sheet performs an adiabatic as well as a waterproof function.

While a preferred embodiment of the invention has been described by specific terms, such description is for illustrative purposes only, and it is to be understood that changes and variations may be made without departing from the spirit or scope of the following claims.

What is claimed is:
1. An automobile bumper comprising:
a supporting bracket having a substantially rectangular base for mounting on the front or rear side of the automobile;
a bracket casing mounted movably on said supporting bracket;
one or more adiabatic devices received movably in a space defined by said supporting bracket and said bracket casing; and
at least one buffer spring provided between said one or more adiabatic devices and said supporting bracket, wherein said one or more adiabatic devices comprises a plurality of stands, each supporting a winding shaft there-between, a roll of flexible adiabatic sheet wound on said winding shaft, and a reversing rotation means attached to one end of said winding shaft for making the drawn-out flexible adiabatic sheet return to its original wound position when said adiabatic sheet is released, wherein each of said at least one buffer spring is separately supported by a pair of opposing stems, each opposing pair of stems being provided on one of said stands and on an opposing surface of said supporting bracket.

2. An automobile bumper as claimed in claim 1 wherein said supporting bracket comprises a horizontal projecting mounting having a plurality of mortises thereon.

3. An automobile bumper as claimed in claim 1 wherein said bracket casing is provided with a pivotable upper wall and a number of mortises located on a pair of opposed walls thereof.

4. An automobile bumper as claimed in claim 1 wherein said stands are provided with a plurality of corresponding joints for joining with the mortises of said supporting bracket and said bracket casing.

5. An automobile bumper as claimed in claim 2 or 3 wherein said mortises are preferrably T-shaped.

6. An automobile bumper as claimed in claim 4 wherein said joints are preferably T-shaped.

7. An automobile bumper as claimed in claim 1 wherein one side of said stands is provided with a stem for supporting one end of said at least one buffer spring.

8. An automobile bumper as claimed in claim 1 wherein said supporting bracket is provided with a stem for supporting one end of said at least one buffer spring.

9. An automobile bumper as claimed in claim 1 wherein said flexible adiabatic sheet is provided with hook members located at the front edge portion thereof.

10. An automobile bumper as claimed in claim 1 wherein said roll of flexible adiabatic sheet has preferably a substantially square section.

* * * * *